United States Patent [19]

Whelan

[11] 3,744,907
[45] July 10, 1973

[54] LIQUID TESTER

[76] Inventor: Paul L. Whelan, P.O. Box 529, Dallas, Tex. 75080

[22] Filed: Feb. 4, 1972

[21] Appl. No.: 223,619

[52] U.S. Cl............... 356/70, 356/208, 356/246
[51] Int. Cl........................ G01n 33/28, G01n 1/10
[58] Field of Search................. 356/42, 246, 70, 356/201, 208

[56] References Cited
UNITED STATES PATENTS

| | | | |
|---|---|---|---|
| 2,595,082 | 4/1952 | Kertesz | 356/246 |
| 1,878,847 | 9/1932 | Hausser et al. | 356/42 |
| 2,027,130 | 1/1936 | Towne | 356/246 |
| 2,835,412 | 5/1958 | Clurman | 356/246 |
| 3,464,772 | 9/1969 | Day | 356/246 |

*Primary Examiner*—Ronald L. Wibert
*Assistant Examiner*—V. P. McGraw

[57] ABSTRACT

An article for receiving a small sample of liquid and holding the sample in a chamber of predetermined shape so that indicia on the bottom of said chamber can be viewed through the liquid and thereby used to accurately determine the level of contamination of the sample.

4 Claims, 4 Drawing Figures

3,744,907

LIQUID TESTER

BACKGROUND OF THE INVENTION

Previous inventions have provided for passing light through a sample body of oil of controlled thickness and for measuring the intensity of the transmitted light with instrumentation or for comparing this transmitted light by visual means with light filtered by standard light filters of various composition.

The purpose of this invention is to provide a means with a very low manufacturing cost to measure the contaminates in a liquid such as oil by determining the point where said contaminates just barely allow a mark or raised bar or other indicia to be seen when viewed through the oil sample of a controlled thickness. This invention obviates the need for a measurement of the light filtered through the sample and the consequent electronic circuitry. This invention also eliminates the color matching and visual accuracy required in the operation of many of the non-electronic prior art devices.

SUMMARY OF THE INVENTION

According to this invention there is provided an article for testing liquid for contaminates or undissolved materials comprising a body, a depression on one surface of said body, indicia means carried in said depression, said indicia means being below said surface of said body so that when liquid substantially fills said depression said indicia means is submerged in said liquid.

In use, this depression in said body is substantially filled with a sample of liquid to be tested and the said indicia means are viewed through the said liquid with the ability to discern each indicia means and the depth of this discerned indicia means providing an index of the amount of contaminants or undissolved materials in the sample. The depression is readily cleaned to provide for measurement of other liquid samples by the same method. The said depression can, for example, be made small enough to be filled by the amount of oil commonly found on the dipstick of a motor vehicle engine. Accordingly, it is an object of this invention to provide a new and improved article for testing whether lubricating oil should be changed.

It is another object to provide a new and improved article for testing a liquid for contamination.

It is another object to provide a compact, non-electrical device for determining the extent of contamination of a liquid.

It is another object to provide a new and improved article for determining the extent of dissolved solids in a liquid.

It is another object to provide an article for testing a very small volume of liquid for contamination.

DETAILED DESCRIPTION OF THE INVENTION

Figure 1:
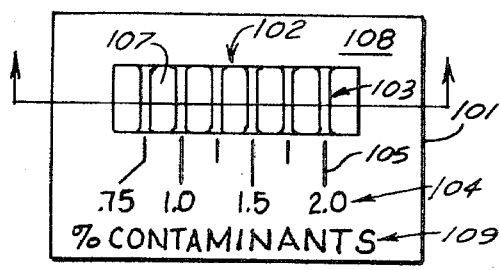
FIG. 1 shows a plan view of an article according to this invention.

More specifically, FIG. 1 shows a body 101 which can be made of plastic, metal or the like with a depression 102 in one surface with indicia means 103 consisting of bars rasised above the bottom surface 107 of the depression so that when viewed through a liquid with undissolved materials substantially filling the depression 102 the bars 103 are visible as lighter areas in contrast to the bottom 107 of the depression which is seen as a darker shade.

Markings 104 of an appropriate nature are engraved or stamped on the surface 108 of the device body as well as connecting lines 105 so as to identify the bar of the greatest depth which is visible for a given sample liquid and relate it to a value or factor of reference meaningful to the user.

With depression 102 filled with an uncontaminated liquid sample all of bars 103 are visible. As liquid samples of a progressively more contaminated degree are placed in depression 102, it will not be possible to see bars 103 which are deeper. As the degree of contamination of each liquid sample continues to increase, more bars 103 of a shallower depth will disappear till a liquid sample is found which will prevent all bars 103 from being visible.

Figure 2:
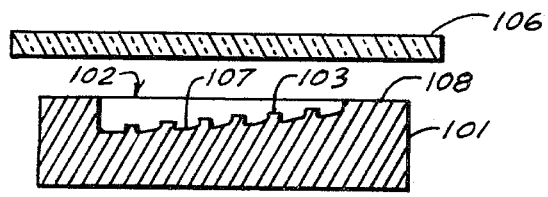
FIG. 2 shows a cross-section view of the article shown in FIG. 2.

FIG. 2 shows a cross-section view of the body 101 shown in FIG. 1 illustrating the different depths of the indicia bars 103 in the bottom of depression 102.

Translucent member 106 can be used as a cover to more accurately define the upper surface of the liquid sample when placed in contact with surface 108 of body 101.

Member 106 can be made wide enough perpendicular to the cross-section plane illustrated so that said member 106 covers completely depression 102 when placed in contact with surface 108 of body 101. Member 106 can also be placed in contact with surface 108 of body 101 so as not to completely cover depression 102, thereby leaving a gap or opening, not illustrated, through which gap or opening liquid may be introduced to depression 102 or removed from depression 102. Other identifying or calibration data marks 109 may be used on surface 108.

Figure 3:
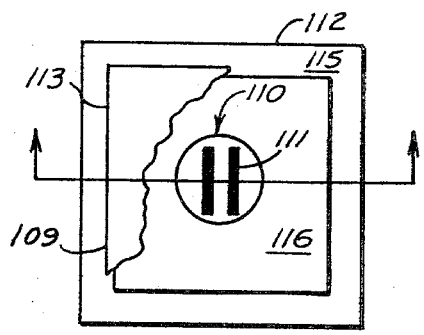
FIG. 3 shows a plan view of another embodiment of this invention.
Figure 4:
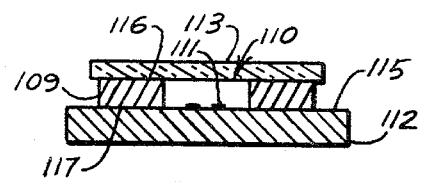
FIG. 4 shows a cross-section view of the article shown in FIG. 3.

FIG. 3 shows a body 112 which can be made of plastic, metal or the like with a surface 115 and an indicia means 111 on said surface and a member 109 having two opposing planar surfaces 116 and 117 and an opening 110 connecting surfaces 116 and 117.

Member 109 placed in contact with surface 115 of body 112 forms a pocket in opening 110 which will contain a liquid sample. With a non-contaminated liquid sample filling said pocket such as unused motor oil indicia means 111 is visible through said liquid sample. If said liquid sample is removed and a series of liquid samples having increasingly larger extents of contamination are placed in said pocket, one level of contamination will be found which will not allow indicia means 111 to be visible. A slight lessening of this level of contamination will produce a liquid sample which allows indicia means 111 to just barely be visible. This contamination level which allows indicia means 111 to be barely visible corresponds to one and only one thickness of member 109 and for a certain range of contamination levels a thickness for member 109 can be found by experimentation or other means for any single level of contamination within this range, which with member 109 constructed of said thickness, will form a pocket 110 which will allow indicia means 111 to be just barely visible viewed through said pocket with liquid of said contamination level filling said pocket.

A device can be made with a plurality of members 109 each having a different thickness to provide means for determining an equal number of contamination levels of liquid used in the above described manner. Cover member 113 can be made to contact surface 116 of member 109 and made of a material through which can be seen pocket 110 and indicia means 111. Said cover member 113 can be disposed contacting said surface 116 to better contain the liquid sample and to better define the upper surface of any liquid sample contained in pocket 110.

Indicia means 111 are substantially the same height, but can be different heights if desired. Indicia means can also be marks on surfaces 107 or 115, e. g., a painted line on or a groove in 107 or 115.

Reasonable variations and modifications are possible within the scope of this disclosure without departing from the spirit and scope of this invention.

I claim:

1. An article for testing liquid for undissolved materials comprising a body an elongate depression on one surface of said body, indicia means carried in said depression, said indicia means being below said surface of said body so that when liquid substantially fills said depression, said indicia means is submerged in said liquid, said indicia means comprises a plurality of projections extending transversely to the long axis of said depression, said projections being spaced apart and having their upper surface intermediate the bottom of said depression and said surface of said body, each upper surface of each indicia means being at a different depth below said surface of said body.

2. An article according to claim 1, wherein said depression slopes downwardly from one end to another along the long axis thereof and has a plurality of raised bars having progressively lower upper surfaces from the upper end to the lower end of said depression thereon as indicia means, and said depression is sized so as to be substantially filled by the amount of oil commonly found on the dipstick of of a motor vehicle engine.

3. An article according to claim 1 having a member through which said indicia means are visible, extending over said depression, said member forming the upper surface of any liquid filling said depression.

4. An article according to claim 2 having a member through which said indicia means are visible, extending over said depression, said member forming the upper surface of any liquid filling said depression.

* * * * *